United States Patent [19]
Ward et al.

[11] Patent Number: 5,623,861
[45] Date of Patent: Apr. 29, 1997

[54] PNEUMATIC CYLINDER AND CONTROL VALVE THEREFOR

[75] Inventors: Allan Ward, Wimborne; David J. Trimmer, Poole, both of England

[73] Assignee: Savair, Inc., St. Clair Shores, Mich.

[21] Appl. No.: 480,532

[22] Filed: Jun. 7, 1995

Related U.S. Application Data

[63] Continuation of Ser. No. 267,495, Jun. 29, 1994.

[30] Foreign Application Priority Data

Jul. 8, 1993 [GB] United Kingdom ............. 9314145
Jun. 9, 1994 [EP] European Pat. Off. ........... 94304157

[51] Int. Cl.⁶ ......................... F15B 11/08; F15B 13/04
[52] U.S. Cl. ................. 91/420; 91/422; 91/442; 91/443; 91/452; 91/520; 251/117; 137/513.3
[58] Field of Search ............... 91/396, 403, 405, 91/420, 422, 443, 442, 468, 462, 451, 452, 511, 517, 520, 533; 92/110, 111, 151; 137/513.3; 251/117

[56] References Cited

U.S. PATENT DOCUMENTS

| | | | |
|---|---|---|---|
| 2,310,100 | 2/1943 | Losey et al. | 91/443 X |
| 2,370,068 | 2/1945 | Palm | 91/329 |
| 2,747,371 | 5/1956 | Critchley | 91/443 X |
| 2,870,744 | 1/1959 | Hallerstrom | 91/395 |
| 2,935,047 | 5/1960 | Ortman et al. | 91/396 |
| 3,054,385 | 9/1962 | Hanna | 91/396 X |
| 3,067,726 | 12/1962 | Williams | 91/396 X |
| 3,187,730 | 6/1965 | White | 92/151 X |
| 3,395,725 | 8/1968 | Roach | 137/513.3 X |
| 3,974,742 | 8/1976 | Johnson | 91/443 X |
| 4,132,153 | 1/1979 | Grotness et al. | 91/443 X |
| 4,258,609 | 3/1981 | Conway | 92/110 X |
| 4,280,326 | 7/1981 | Moodie | 91/533 X |
| 4,287,812 | 9/1981 | Iizumi | 91/421 X |
| 4,638,718 | 1/1987 | Nakamura | 91/396 X |
| 4,745,845 | 5/1988 | Legris et al. | 91/420 X |
| 4,759,260 | 7/1988 | Lew | 91/533 X |
| 4,767,282 | 8/1988 | Igarashi et al. | 91/329 X |
| 5,125,325 | 6/1992 | Czukkermann | 91/409 X |
| 5,174,191 | 12/1992 | Leinweber et al. | 91/519 |
| 5,191,825 | 3/1993 | Beneteau et al. | 92/110 X |
| 5,349,151 | 9/1994 | Eisbrenner et al. | 91/448 X |

FOREIGN PATENT DOCUMENTS

| | | | |
|---|---|---|---|
| WO92/17311 | 10/1992 | European Pat. Off. | |
| 325269 | 8/1919 | Germany | 91/329 |
| 3328564 | 3/1985 | Germany | |
| 3542069A1 | 12/1986 | Germany | |
| 4012968 | 10/1991 | Germany | |
| 9101143 | 1/1991 | Netherlands | |
| 1418517 | 8/1988 | U.S.S.R. | 91/396 |
| 1455-069-A | 1/1989 | U.S.S.R. | 91/443 |

*Primary Examiner*—John E. Ryznic
*Attorney, Agent, or Firm*—Remy J. VanOphem; Thomas A. Meehan; John VanOphem

[57] ABSTRACT

A pneumatic cylinder, especially for a spot-welding machine, has a sleeve valve mounted on the piston rod. The sleeve valve provides a venting valve for dumping pressure from a return chamber at the end of the forward stroke, and a progressive restrictor to close off a forward chamber and provide cushioning at the end of the return stroke.

15 Claims, 9 Drawing Sheets

BACK POSITION
SLEEVE VALVE CLOSED

BACK POSITION SLEEVE VALVE CLOSED

FORWARD STROKE
SLEEVE VALVE CLOSED.

STROKE COMPLETED
SLEEVE VALVE OPEN

RETURN STROKE
SLEEVE VALVE CLOSED

PNEUMATIC CYLINDER AND CONTROL VALVE THEREFOR

This is a continuation, of application Ser. No. 08/267, 495, filed Jun. 29, 1994.

BACKGROUND OF THE INVENTION

1. Field of the Invention

This invention relates to pneumatic cylinders and control valves for such cylinders. It is particularly applicable to cylinders for use in, for example, spot welding machines, piercing machines, powered jigs or clamps.

2. Description of the Prior Art

There already exist various types of pneumatic cylinders with either internal or external flow controls and cushioning devices.

For some types of heavy duty production operations these typical designs do not meet specific production needs. This is especially true of pneumatic cylinders used in resistance spot welding and some piercing or clamping operations.

For example, in resistance spot welding an air cylinder with an electrode and associated equipment attached to the piston rod is typically expected to stroke forward, contact the component and reach full welding force in 0.2 seconds. It must precisely hold this force for the welding and cooling period of typically 0.4 seconds and during this period rapidly follow up at constant force the collapse or indentation of the components during welding.

To achieve this fast and then stable force condition it is usual to ensure that air can be supplied to and exhausted from the power cylinder very quickly. In addition, the end of the forward stroke is determined not by the cylinder but by the contact point of the electrode which changes during its production life as the electrode is consumed, worn, re-profiled or replaced.

This combination of rapid force build up and variable end of stroke positioning make traditional cushioning and speed control devices difficult to apply, and without them the shock loads, noise, wear and vibration of tooling and equipment in use is considerable.

One such cylinder is shown in U.S. Pat. No. 5,174,191. In that cylinder, the above-described functions are achieved at the penalty of using a large number of components, leading to a complex and expensive device.

SUMMARY OF THE INVENTION

The preferred embodiments of the present invention have as one object the provision of an alternative solution using a much simpler and less expensive construction. Another object of some embodiments is to provide a cylinder in which the movement of the piston is braked at the end of its return stroke. In this specification the term "piston" is used generally to include the piston heads and piston rods together making up a piston assembly moveable in a cylinder body. Similarly, "pneumatic", while referring primarily to compressed air, also includes other compressed gases used as a power source.

According to one feature of the invention a pneumatic cylinder is provided which embodies a cylinder body containing a piston and defining therewith first and second pressure chambers such that pressurization of the first chamber effects relative movement of the piston and cylinder in a first direction, and pressurization of the second chamber effects relative movement of the piston and cylinder in an opposite direction. A device is provided to restrict venting of the second chamber during relative movement of the piston and cylinder in the first direction, and a valve assembly is operative when the relative movement is arrested and then vents the pressure in the second chamber. The valve assembly is also operative to progressively restrict venting of the first chamber when relative movement of the piston and cylinder in the opposite direction approaches a limiting extent thereof to retard the relative movement.

The valve assembly may also restrict the supply of fluid pressure to the second chamber when the relative movement in the opposite direction approaches the limiting extent.

The valve assembly may embody a first portion cooperating with the fixed structure of the cylinder body to define a venting valve which opens to vent the second chamber, and a second portion cooperating with the piston to define a restrictor valve which progressively closes during relative movement in the opposite direction.

The valve assembly may be a sleeve valve carried by the piston coaxially therewith.

In a preferred embodiment, the first portion of the valve assembly is a flange on the sleeve valve having a radially extending sealing surface, the fixed structure of the cylinder body having a shoulder with a matching sealing surface. The flange and shoulder may also serve to restrict the supply of fluid pressure to the second chamber, as set forth above.

The restrictor valve may embody a portion of the sleeve valve having an axially extending tapered bore through which the piston passes, the piston having a port on a circumferential surface which communicates with the first chamber via the tapered bore, progressive restriction of venting of the first chamber being effected by relative movement of the port in the tapered bore towards the smaller end thereof.

The cylinder may have a third pressure chamber adapted to be pressurized to effect relative movement of the piston and cylinder in the first direction, the third pressure chamber communicating with the first chamber via a conduit in the piston which is connected to the port.

According to another feature, the invention provides a pneumatic cylinder which is a cylinder body containing a piston and defining therewith first and second pressure chambers such that pressurization of the first chamber effects relative movement of the piston and cylinder in a first direction, and pressurization of the second chamber effects relative movement of the piston and cylinder in the opposite direction. A device is provided to restrict venting of the second chamber during relative movement in the first direction and a valve assembly is operative upon the relative movement being arrested to vent the pressure in the second chamber. The valve assembly embodies a sleeve valve carried on and coaxial with the piston and cooperating with the fixed structure of the cylinder body.

The device to provide restricted venting may be adjustable to control the speed of relative movement in the first direction.

A further disadvantage of known power cylinders is that the control mechanism is located within the cylinder, again increasing complexity and cost. According to another feature of the invention, as discussed below, this disadvantage is avoided.

A control valve for a pneumatic cylinder is provided which includes a valve block with a valve spool moveable axially therein. The valve block and valve spool define a first conduit through the valve block which is adapted to conduct fluid pressure to a first pressure chamber of the cylinder. A second conduit through the valve block is controlled by valve surfaces of the valve block and valve spool and is adapted to be connected to a second oppositely acting pressure chamber of the cylinder. Oppositely facing pressure surfaces of the valve spool are respectively exposed to fluid pressure in the respective conduits such that pressure applied to the downstream end of the second conduit biases the valve spool to maintain the second conduit closed. A restricted bleed conduit by-passing the valve surfaces in the second conduit is also provided.

This feature of the invention is particularly suitable for simple pneumatic power cylinders with a single piston, and also to improve equipment not fitted with a low impact cylinder. The control valve may be a separate unit or it may be integrated as convenient with a cylinder head or body, as appropriate for a specific application.

The degree of restriction provided by the restricted bleed conduit may be adjustable.

The restricted bleed conduit may be formed by a passage in the valve spool, or by a passage through the valve body.

The bleed conduit may be adapted to provide both restricted venting of the second chamber during a forward stroke of the piston of the pneumatic cylinder, and to restrict the supply of fluid pressure to the second chamber as the piston approaches the end of its return stroke.

The invention also includes a control valve as set forth above in combination with a pneumatic cylinder having a piston and first and second oppositely-acting pressure chambers.

Objects, features, and advantages of the invention will be better understood from the following description with reference to the accompanying drawings.

DETAILED DESCRIPTION OF THE PREFERRED EMBODIMENT

Figure 1:
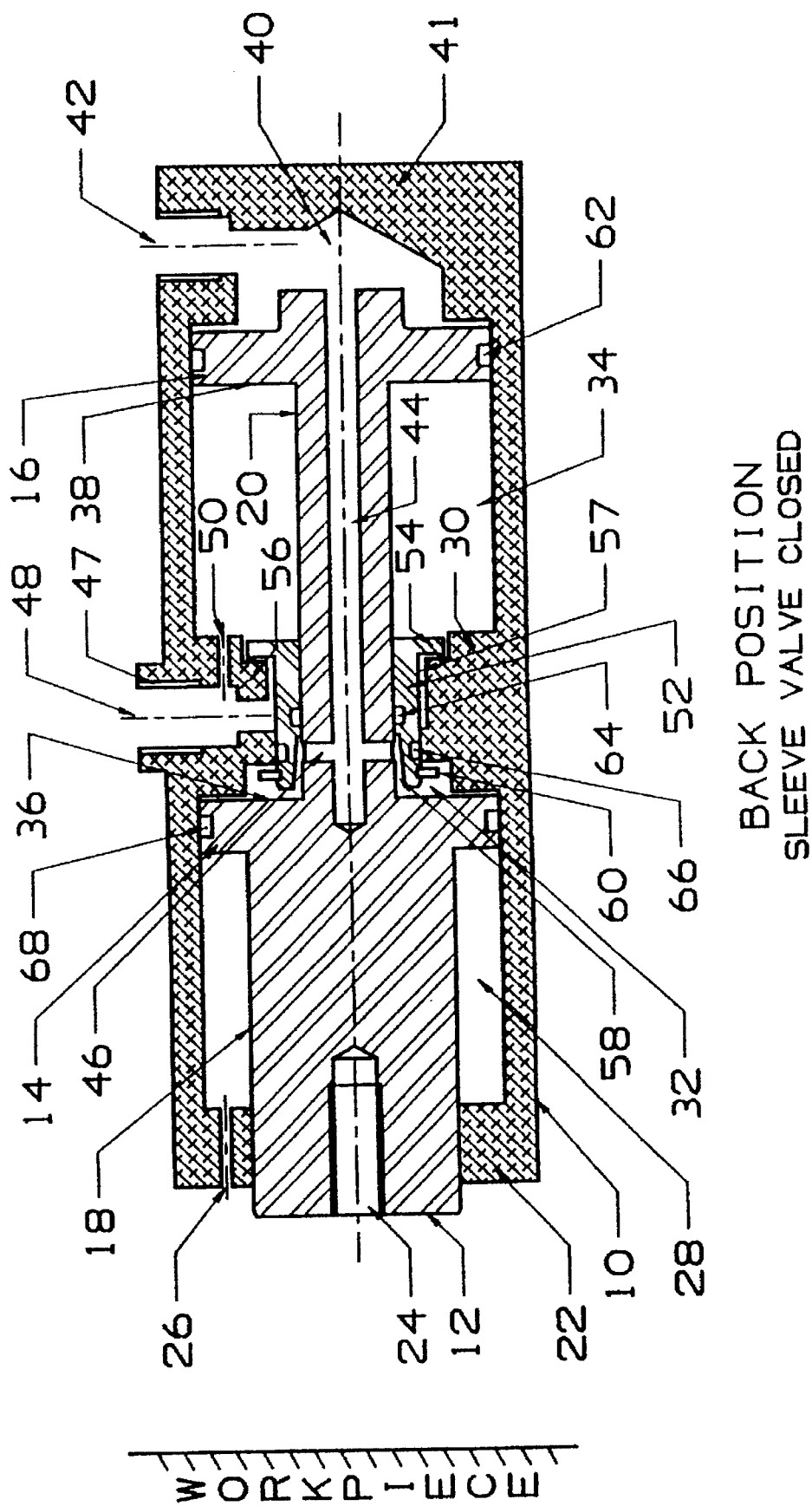
FIGS. 1 to 4 show successive stages in the operation of a cylinder according to the invention.

Referring to FIG. 1, a pneumatic cylinder according to the invention includes a cylinder body 10 having a piston assembly 12 therein. The piston assembly 12 has two piston heads 14 and 16 and piston rods 18 and 20. The piston rod 18 is supported in an end wall 22 of the cylinder body 10 and in this example is provided with an internally threaded bore 24 enabling the piston rod 18 to be connected to, for example, a spot-welding head. Normally, the end of the piston rod 18 would conform to the ISO standard for tooling and electrode mountings. The wall 22 has a vent hole 26 to prevent a build-up of pressure in the otherwise closed space 28 behind the piston head 14.

The cylinder body 10 has an intermediate wall 30 which defines first and second pressure chambers 32 and 34 with opposing faces 36 and 38 of the piston heads 14 and 16. A third chamber 40 is defined between the other face of the piston head 16 and an end 41 of the cylinder body 10. An internally-threaded port 42 for connection to a source of compressed air or other pressurized gas is provided to the third chamber 40 to drive the piston in its working stroke. The third chamber 40 communicates via an axial bore 44 and ports 46 in the circumferential surface of the piston rod 20 with the first pressure chamber 32.

The second pressure chamber 34 is provided with a return port 48 having an internal thread 47 for the supply of compressed air to the piston head 16 to drive the piston assembly in its return stroke. A bleed hole 50 provides restricted venting of the second pressure chamber 34 during the forward (power) stroke of the piston assembly 12.

A sleeve 52 is in a close sliding relationship with the piston rod 20 within the intermediate wall 30, and has at one end a flanged portion 54, one radially extending face of which forms a venting valve with a shoulder 56 on the intermediate wall 30. An annular space 57 permits flow between the second pressure chamber 34 and the return port 48 when the venting valve 54, 56 is open. At the other end of the sleeve 52, the internal bore of the sleeve 52 has an enlarged tapering portion or bore 58 which cooperates with the ports 46 to form a progressively variable restriction in the conduit between the first and third chambers 32 and 40, as hereafter described.

To permit assembly of the piston assembly 12 in the cylinder the piston heads 14 and 16 are separable from the piston rod 20, and the end wall 22 and intermediate wall 30 of the cylinder body each are removable. A circlip 60 limits the travel of the sleeve 52 within the intermediate wall 30. Grooves 62, 64, 66, and 68 contain piston rings, O-rings or other suitable conventional seals (not shown) to minimize unwanted leakage from or between the chambers of the cylinder body 10.

The operation of the cylinder will now be described. In FIG. 1, the piston is fully retracted and a conventional air directional valve (not shown) maintains this position by exhausting the first and third chambers 32 and 40 to atmosphere and supplying air under pressure to the second chamber 34. The venting valve 54, 56 is maintained closed by the pressure in the second chamber 34.

Figure 2:
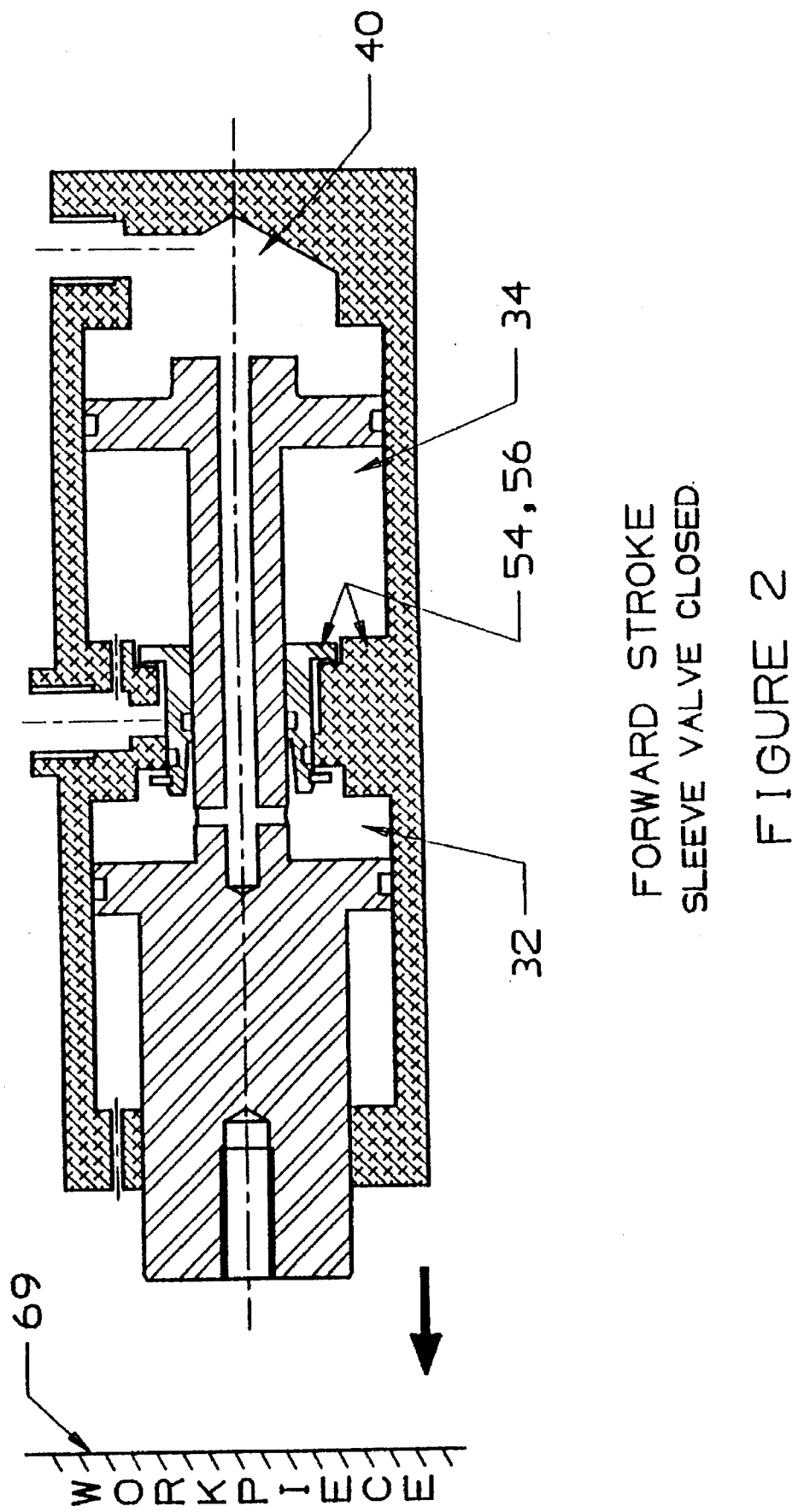

In FIG. 2, the air directional valve is energized, the first and third chambers 32 and 40 are pressurized and the return port 48 is exhausted to atmosphere. The piston assembly 12 moves leftwards relative to the cylinder body 10 towards a workpiece 69, the speed of movement being controlled by the size of the bleed hole 50 and any leakage past the venting valve 54, 56. Relatively high pressure is maintained in the second chamber 34 by the piston movement under the working pressure in the first and third chambers 32 and 40 against the resistance of the bleed hole 50 thereby maintaining the venting valve 54, 56 closed.

Figure 3:
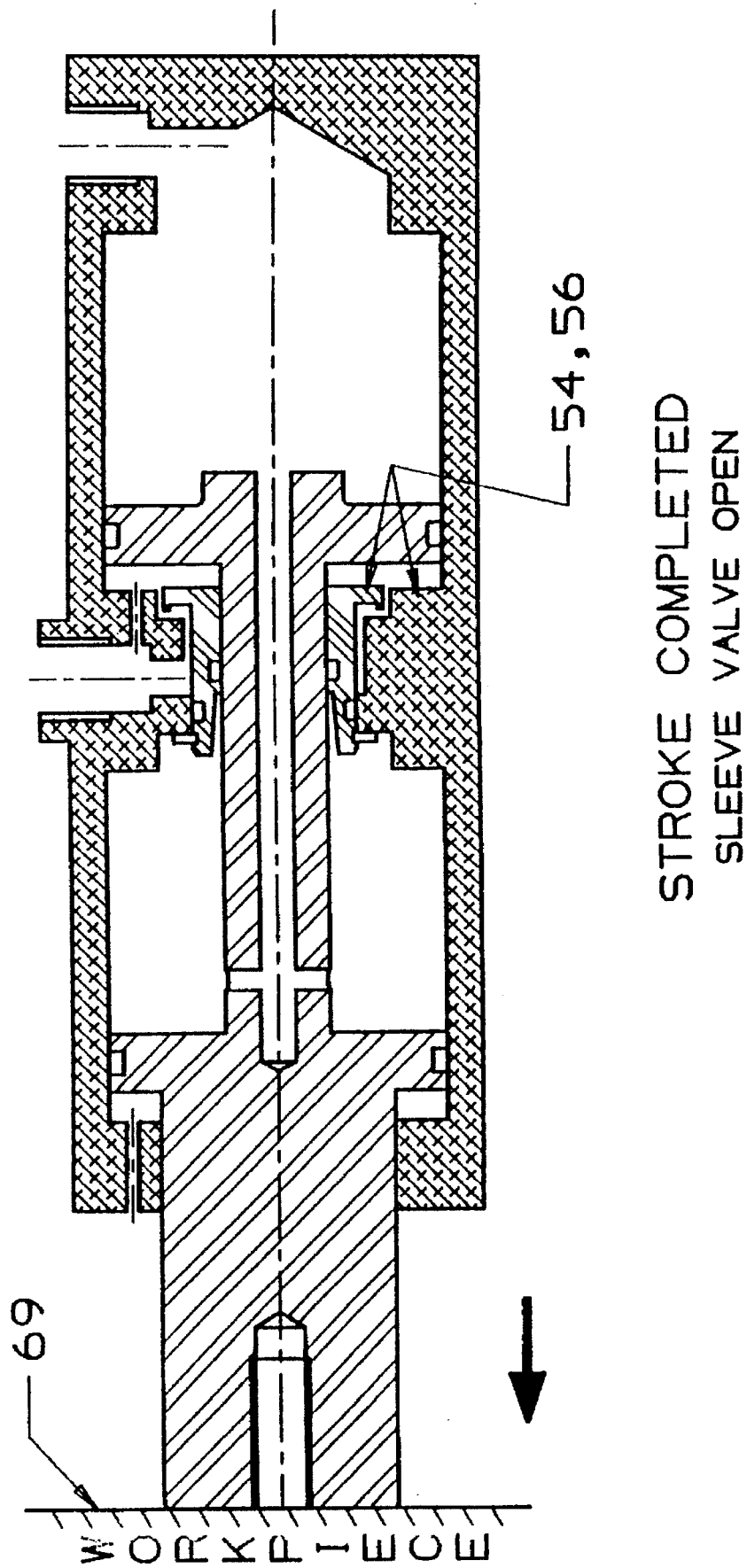

In FIG. 3, the piston assembly 12 has ceased moving due to the workpiece having contacted an electrode, punch, clamp or other tool. The pressure in the second chamber 34 continues to fall as air discharges through the bleed hole 50, and the pressure in the first and third chambers 32 and 40 quickly increases up to the maximum available supply pressure. Under the effect of the pressure differential between the first and second chambers 32 and 34 the sleeve 52 moves to the right, opening the venting valve 54, 56 and rapidly exhausting the air in the second chamber 34 to atmosphere through the directional air valve.

To effect the return Stroke the air directional valve is de-energized, exhausting the air in the first and third chambers 32 and 40 while supplying pressurized air to the second chamber 34. Initially the higher pressure in the first chamber 32 relative to the second chamber 34 holds the venting valve 54, 56 Open, allowing compressed air to rapidly enter the second chamber 34. As the first chamber 32 exhausts the balance of pressure changes and the sleeve 52 moves left, closing the venting valve 54, 56 and restricting the flow of air into the second chamber 34 to that passing through the bleed hole 50.

Figure 4:
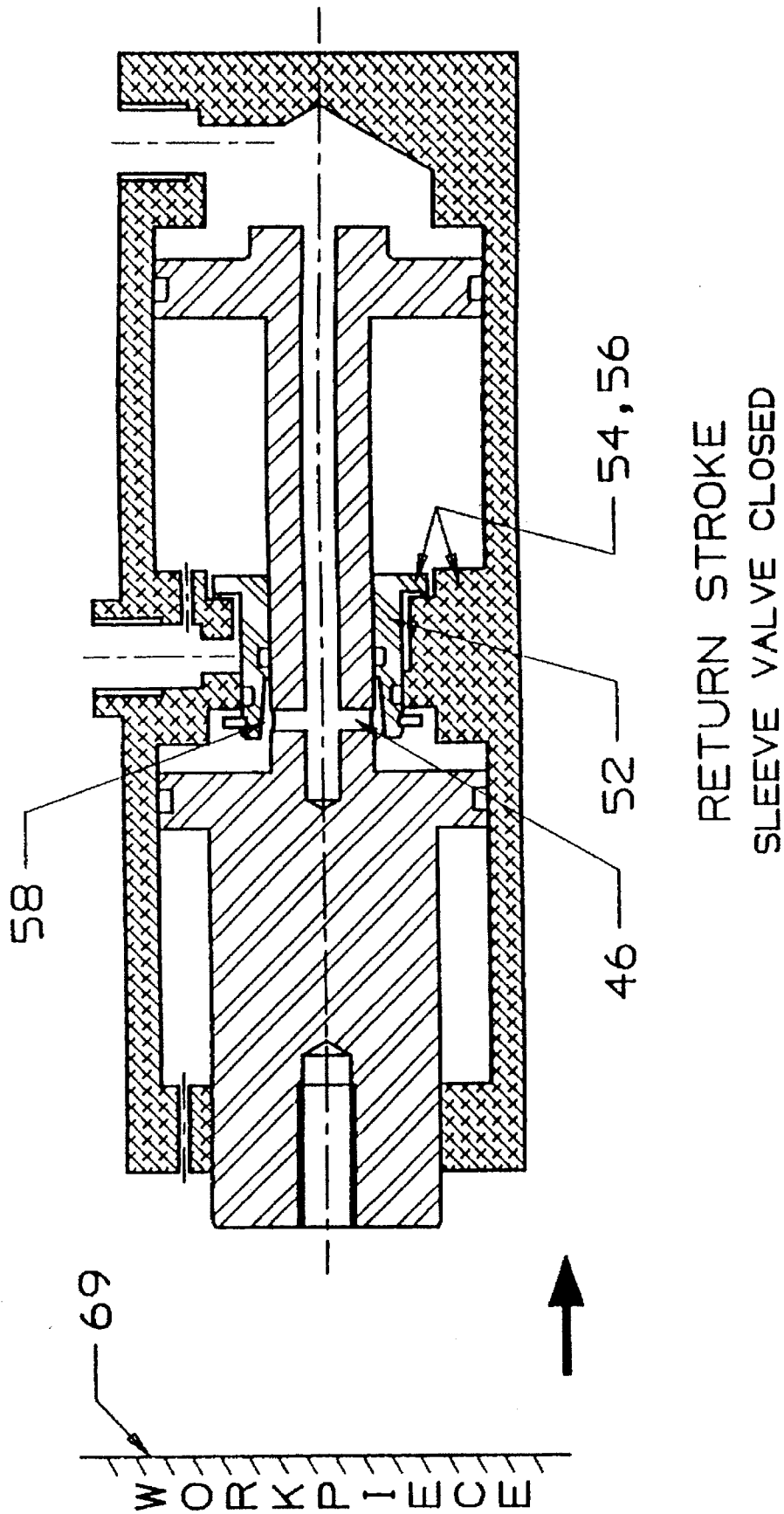

Referring to FIG. 4, as the piston assembly 12 retracts into the cylinder body 10, the ports 46 become progressively restricted as they enter the tapered bore 58 of the sleeve 52. The restricted supply of pressurized air to the second chamber 34 together with the progressive increase in pressure in the first chamber 32 due to the increasing restriction of the ports 46 retards the rightward movement of the piston assembly 12 as it approaches the end of its stroke, and cushions or eliminates the impact between the piston assembly and cylinder body at the end of the stroke.

Figure 5:
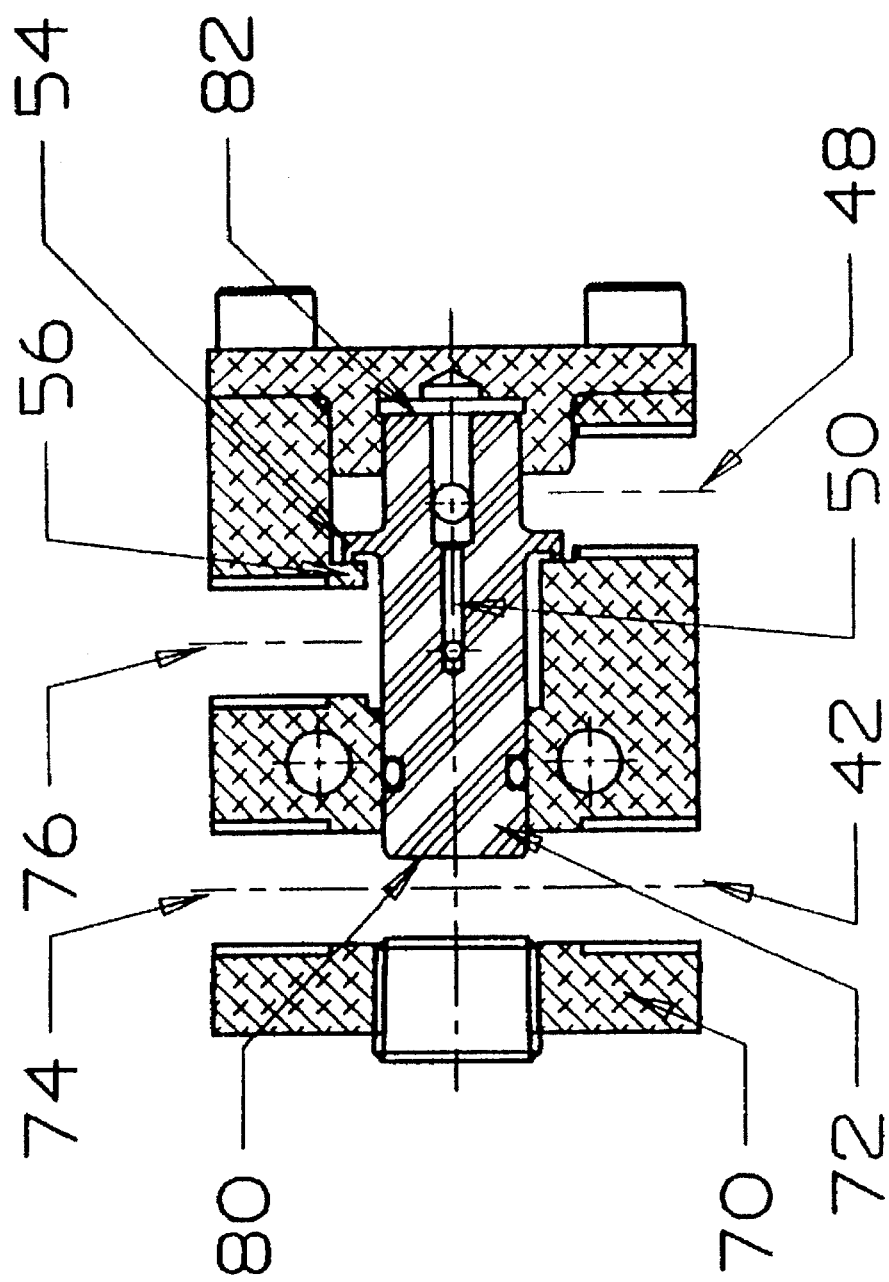
FIG. 5 shows a control valve according to the invention.

FIG. 5 shows a control valve for use with a conventional double-acting single or dual piston pneumatic cylinder without internal valves. The control valve embodies a valve block 70 in which is disposed a valve spool 72. Forward and return ports are intended to be connected to the forward and return chambers of the cylinder, and are thus numbered 42 and 48, as in FIG. 1. The port 42 communicates with a first open conduit 74 through the valve block 70, and the port 48 communicates with a second conduit 76 through the valve block 70 which is controlled by the valve spool 72. The valve spool 72 has a flange 54 which similarly to FIG. 1 forms a venting valve with a shoulder 56 of the valve block 70; these ports are numbered as in FIG. 1 to indicate similarity of function. A restricted bleed conduit 50 passes through the valve spool 72, by-passing the venting valve 54, 56 so as to be functionally equivalent to the bleed hole 50 of FIG. 1.

Oppositely facing pressure surfaces 80 and 82 on the valve spool 72 are exposed to the pressure at the ports 42 and 48, respectively.

When fitted to a double-acting cylinder, the valve of FIG. 5 controls the cylinder to operate on its forward stroke similarly to the cylinder of FIG. 1. Thus the bleed conduit 50 maintains a back-pressure in the return chamber of the cylinder, holding the venting valve 54, 56 closed until the piston rod contacts the workpiece and stops. Then the pressure at the port 48 decays, enabling the pressure in the first conduit 74 to move the valve spool 72 to the right, opening the venting valve 54, 56 and dumping the remaining pressure in the port 48 and the cylinder chamber connected thereto.

On the return stroke, the forward air pressure at the port 42 is removed and the pressure in the forward chamber rapidly decays. The venting valve 54, 56 is at first open allowing a fast flow of pressurized air through the port 48 to the return chamber of the cylinder.

As the cylinder forward air pressure reduces and the return air pressure increases the venting valve 54, 56 closes, and the supply of air to the return side of the cylinder becomes restricted to that passing through the bleed conduit 50.

The practical effect of this is to very quickly return the piston assembly to its initial position, but under reducing pressure which gives a noticeable reduction of impact force when the mechanism reaches its limit-stop at the end of the return stroke.

The invention may be applied in both the forms shown in FIGS. 1 to 4 and FIG. 5 to multiple pistons. Such multiple piston arrangements may be achieved as shown in FIGS. 1 to 4, in which forward pressure is applied to the multiple pistons via bores in the piston rods, and return pressure either by a single return port as shown or by separate return ports. Thus in FIG. 6 (in which already-described parts carry the same reference numerals) a modified form of the apparatus has in addition a piston 16' on an extended piston rod 20' and bounding chambers 34' and 40'. The forward port 42 communicates with the chamber 40' and the chamber 40 is in this embodiment provided with fluid pressure through an extended bore 44'and a port 46' in the piston rod 20'. An additional return port 48' is provided for the chamber 34', but if preferred only the one port 48 need be provided, the chamber 34' then instead being provided with a vent similar to the vent hole 26 of the chamber or closed space 28.

Increasing the number of pistons enables the force applied during the forward (working) stroke for a given working pressure to be increased without increasing the cylinder bore.

Figure 6:
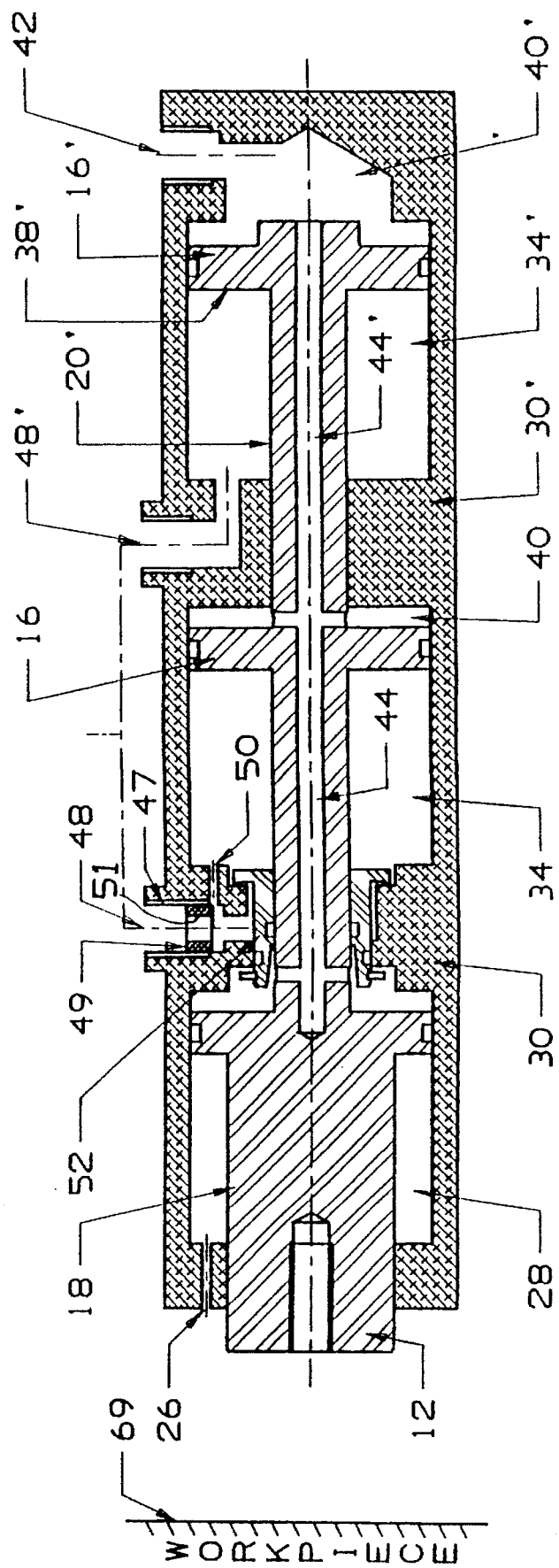
FIGS. 6 and 7 show modified forms of the pneumatic cylinder.

FIG. 6 also shows a modification to the restricted bleed hole 50. The internal thread 47 of the return port 48 is extended as far as the intersection of the bleed hole or conduit 50 with the return port 48, and a hollow sleeve 49 is fitted therein. The sleeve 49 preferably has a hexagonal section recess 51, as indicated in FIG. 6, enabling the sleeve to be screwed in or out of the threaded return port 48 by means of an Allen key, so that its lower end occludes the bleed hole 50 to a greater or lesser extent. The degree of restriction provided by the bleed hole 50 is thereby adjustable, with the result that the speed of the piston assembly 12 during its forward stroke may be controlled.

Figure 7:
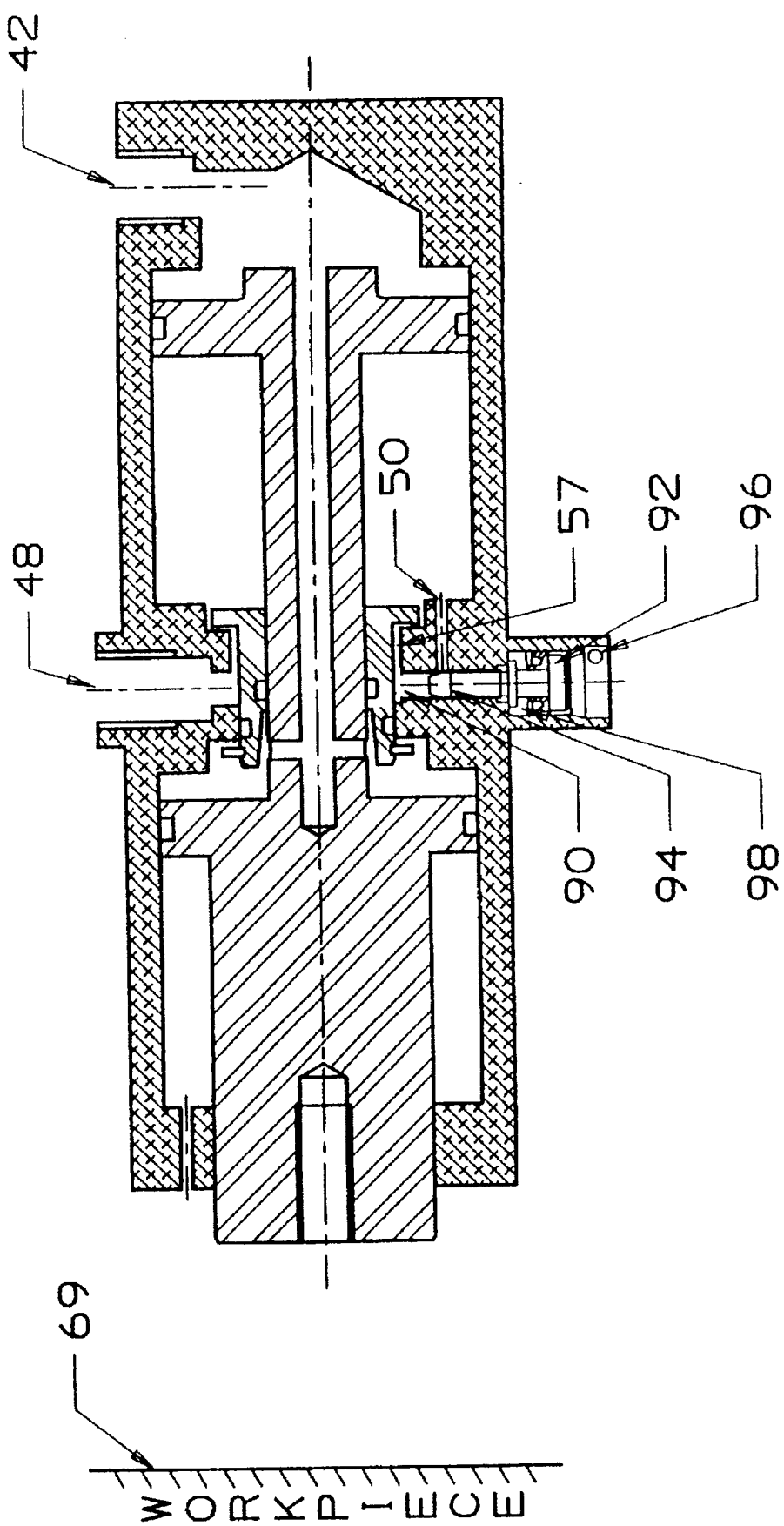

In the double acting cylinder of FIG. 7 (which is otherwise as shown in FIG. 1) the bleed hole 50 is shown bored in the lower portion of the intermediate wall 30, 180° from the return port 48. The bleed hole 50 communicates with a radially-extending tapped bleed conduit 90 which in turn communicates with the annular space 57 and thus with the return port 48. An externally adjustable bleed screw 92 is threaded into the bleed conduit 90 partially to occlude a portion of the bleed hole 50, thereby providing an externally accessible means to control the degree of restriction of the bleed hole 50. The end of the bleed screw 92 is in the form of a truncated cone 94 to permit a finer adjustment of the restriction of the bleed hole 50. The degree of taper is exaggerated in the drawing for clarity. A tapered pin 96 is provided across one side of the outer end of the conduit 90 to prevent the bleed screw from being withdrawn too far, while still permitting access to the head of the screw for adjustment thereof. If withdrawn too far, insufficient threads of the screw would remain engaged with the conduit 90, and the screw may be ejected forcibly and at high velocity by the air pressure in the cylinder. A lip-type seal 98 around the shank of the bleed screw 92 beneath the head minimizes air leakage from the conduit 90 and prevents the ingress of foreign matter.

It will be appreciated that the bleed hole 50 and conduit 90 need not be 180° round from the return port 48, but may be at any convenient angle consistent with simplicity of manufacture.

Figure 8:
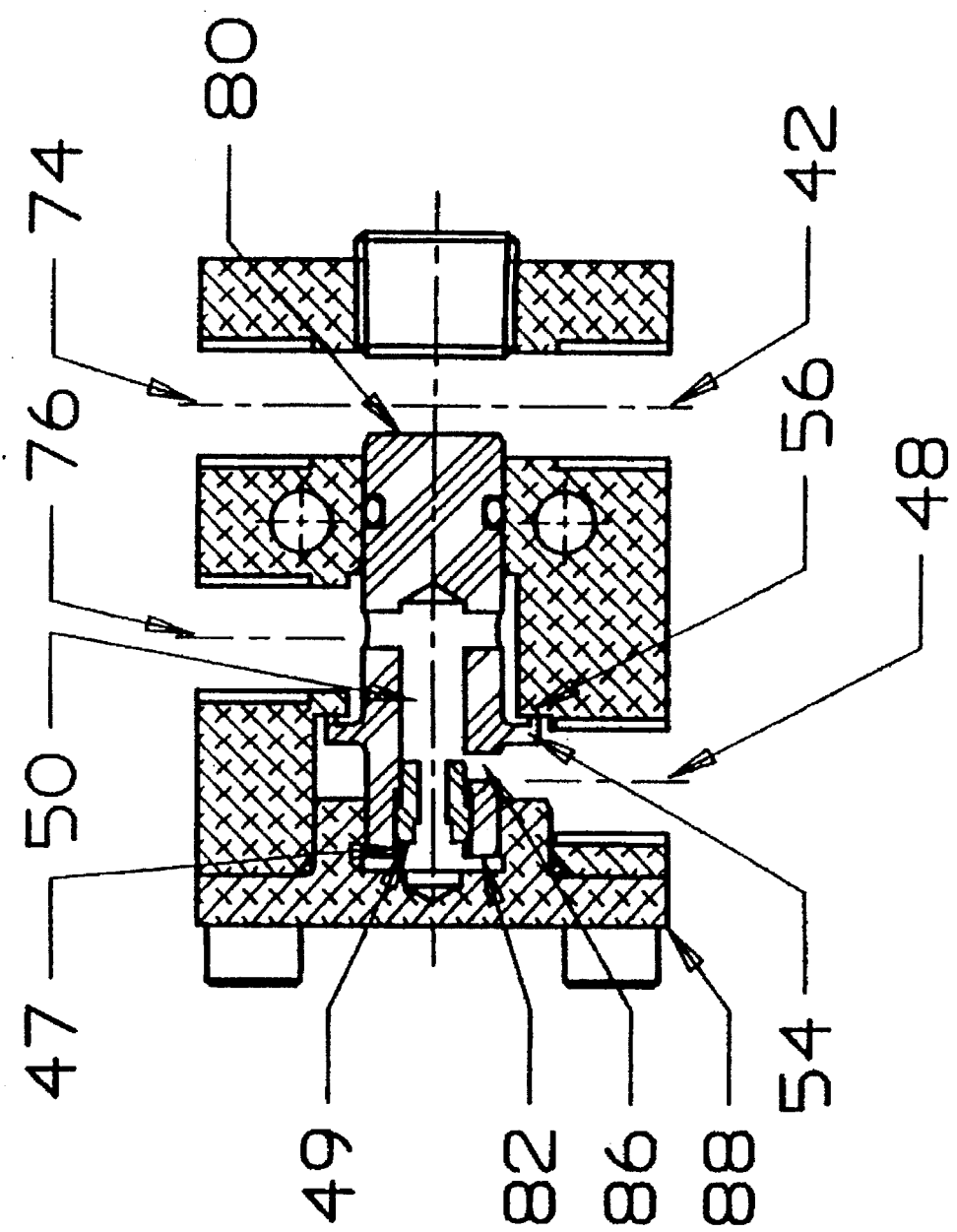
FIGS. 8 and 9A show modified forms of the control valve.
Figure 9C:
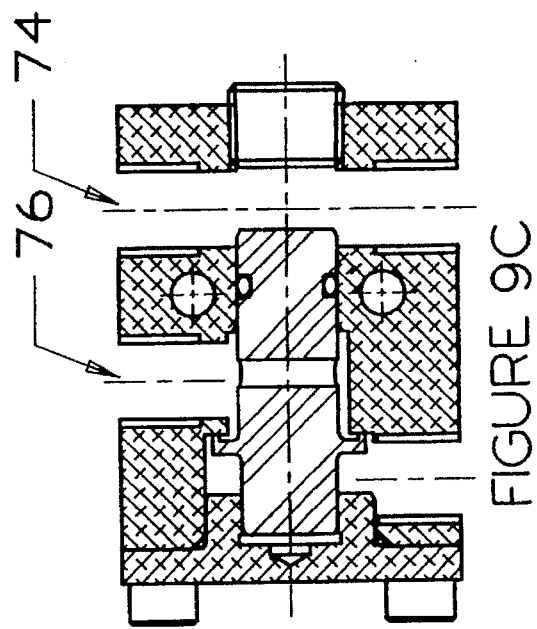
FIGS. 9B and 9C are cross-sectional views of the control valve taken, respectively, in the direction of arrows B—B and C—C of FIG. 9A.

FIGS. 8 through 9C show similar modifications applied to the control valve of FIG. 5. In FIG. 8, at least an end portion of the bleed hole or conduit 50 of the valve spool is internally threaded at 47, and the hollow sleeve 49 with a hexagonal section bore is fitted therein. The sleeve 49 can be screwed in or out partially to occlude a radial portion 86 of the bleed conduit 50, so as to adjust the degree of restriction afforded by the conduit. Access to the sleeve 49 for adjustment is obtained by removing an end plate 88 of the valve body.

Figure 9A:
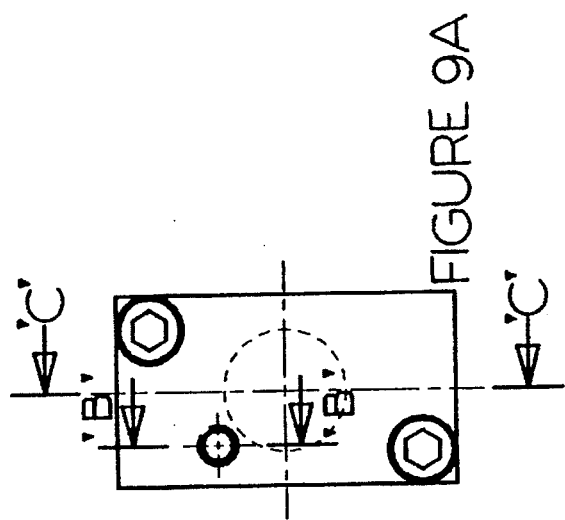
Figure 9B:
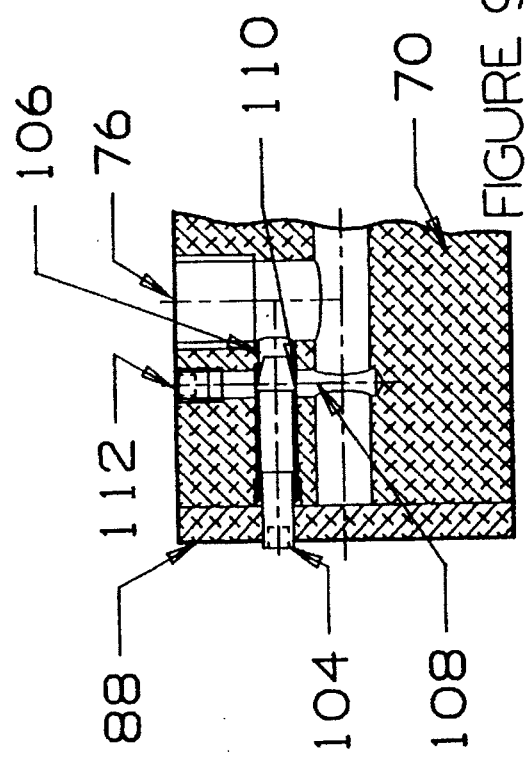

The control valve of FIGS. 9A through 9C provides an externally accessible means of controlling the pressure in the cylinder return port 48. The bleed conduit 50 of FIG. 8 is replaced by bores 106 and 108 in the valve block 70 which intersect to form an orifice 110. The bore 106 communicates with the conduit 76 and the bore 108 communicates with the return port 48. The bore 106 is tapped and contains a bleed adjusting screw 104 having a tapered end, which, depending on the position of the screw, occludes the orifice 110 to a greater or lesser extent. The bore 106 passes through the end plate 88, so that the other (outer) end of the screw 104 is accessible, enabling its position and the degree of bleed through the bores 106 and 108 to be adjusted without dismantling the valve. The outer end of the bore 108 is closed by a plug 112.

For applications such as resistance spot welding, the fixed bleed hole embodiments of FIGS. 1 to 5 are preferred so that every cylinder can have a predetermined production performance. For other applications such as clamping, the variable bleed embodiments will often be preferred.

Both the integral sleeve valves of FIGS. 1 to 4, 6 and 7 and the separate control valves of FIGS. 5, 8 and 9A may be set to operate at chosen and predetermined forward and return pressure balances across the sleeve or valve spool. This is achieved by appropriate choice at the design stage of the diameters of the relevant pressure faces. For most applications, however, the pressure balance is not critical.

It will be apparent to those skilled in the art that numerous alterations and modifications may be made to the present invention as described without departing from the scope of the invention which is to be limited solely by the appended claims.

What is claimed is:

1. A pneumatic cylinder comprising:
   a piston;
   a cylinder body containing said piston and defining therewith a first pressure chamber and a second pressure chamber such that pressurization of said first chamber effects movement of said piston relative to said cylinder body in a first direction, and such that pressurization of said second chamber effects movement of said piston relative to said cylinder body in an opposite direction;
   means associated with said second chamber for providing restricted venting of said second chamber during movement of said piston in said first direction; and
   valve means associated with said cylinder body and operative upon forward movement of said piston in said cylinder body being completed for venting pressure in said second chamber, said valve means also being operative to progressively restrict venting of said first chamber when movement of said piston relative to said cylinder body is in said opposite direction and approaches a limiting extent thereof so as to retard movement of said piston.

2. A pneumatic cylinder as claimed in claim 1, wherein said valve means is further operative to restrict pressurization of said second chamber when movement of said piston in said opposite direction approaches said limiting extent.

3. A pneumatic cylinder as claimed in claim 1, wherein said valve means comprises a first portion cooperating with said cylinder body to define a venting valve adapted to open and thereby vent said second chamber, and wherein said valve means furthers comprises a second portion cooperating with said piston so as to define a restrictor valve which progressively closes during movement of said piston in said opposite direction.

4. A pneumatic cylinder as claimed in claim 3, wherein said valve means is a sleeve valve carried by said piston coaxially therewith.

5. A pneumatic cylinder as claimed in claim 4, wherein said first portion of said valve means comprises a flange on said sleeve valve having a radially extending sealing surface, said cylinder body having a shoulder with a sealing surface complementary to said flange.

6. A pneumatic cylinder as claimed in claim 5, wherein said flange and said shoulder also restrict pressurization of said second chamber when movement of said piston is said opposite direction approaches said limiting extend.

7. A pneumatic cylinder as claimed in claim 4, wherein said restrictor valve comprises a portion of said sleeve valve having an axially extending tapered bore defining a reduced diameter portion through which said piston passes, said piston having a port on a circumferential surface thereof which communicates with said first chamber via said tapered bore, progressive restriction of venting of said first chamber being effected by relative movement of said port within said tapered bore and towards said reduced diameter portion thereof.

8. A pneumatic cylinder as claimed in claim 7 further comprising a third pressure chamber and a passage in said piston communicating with said third pressure chamber and said port, said third pressure chamber being adapted to be pressurized to effect movement of said piston relative to said cylinder body in said first direction, said third pressure chamber communicating with said first chamber via said passage.

9. A pneumatic cylinder comprising:
   a cylinder body having a fixed portion;
   a piston received in said cylinder body so as to define therewith a first pressure chamber and a second pressure chamber such that pressurization of said first chamber effects movement of said piston relative to said cylinder body in a first direction, and pressurization of said second chamber effects movement of said piston relative to said cylinder body in an opposite direction;
   means associated with said second chamber for providing restricted venting of said second chamber during movement of said piston in said first direction; and
   valve means associated with said cylinder body and operative upon forward movement of said piston in said cylinder body being completed for venting pressure in said second chamber, said valve means comprising a sleeve valve carried on and coaxial with said piston and cooperating with said fixed portion of said cylinder body.

10. A pneumatic cylinder as claimed in claim 1, wherein said means for providing restricted venting is adjustable to control a speed of movement of said piston in said first direction.

11. A control valve for a pneumatic cylinder having a piston defining a first pressure chamber and an oppositely-acting second pressure chamber therein, said control valve comprising:

a valve block;

a valve spool axially moveable within said valve block so as to define valve surfaces and first and second conduits through said valve block, said first conduit being adapted to conduct fluid pressure to said first pressure chamber of said pneumatic cylinder, said second conduit being defined by said valve surfaces of said valve block and said valve spool, said second conduit having a downstream portion and being adapted to be connected to said second pressure chamber of said pneumatic cylinder through said downstream portion, said valve spool having oppositely facing pressure surfaces respectively exposed to fluid pressure in said first and second conduits such that pressure applied to said downstream portion of said second conduit biases said valve spool to maintain said second conduit closed; and a restricted bleed conduit by-passing said valve surfaces of said second conduit.

12. A control valve as claimed in claim 11, wherein said restricted bleed conduit provides an adjustable degree of restriction.

13. A control valve as claimed in claim 11, wherein said restricted bleed conduit is formed by a passage through said valve spool.

14. A control valve as claimed in claim 11, wherein said restricted bleed conduit is formed by a passage through said valve block.

15. A control valve as claimed in claim 11, wherein said piston of said pneumatic cylinder has a forward stroke and a return stroke terminating with a return position, and wherein said restricted bleed conduit is adapted to provide restricted venting of said second chamber during said forward stroke of said piston, and to restrict pressurization of said second chamber as said piston approaches said return position of said return stroke.

\* \* \* \* \*

UNITED STATES PATENT AND TRADEMARK OFFICE
CERTIFICATE OF CORRECTION

PATENT NO. : 5,623,861
DATED : April 29, 1997
INVENTOR(S) : Ward et al.

It is certified that error appears in the above-identified patent and that said Letters Patent is hereby corrected as shown below:

Column 4, line 32, between "68" and "contain", kindly insert a space.

Column 4, line 64, kindly delete "Stroke", and insert ----stroke ----.

Column 5, line 2, kindly delete "Open", and insert ---- open ----.

Column 6, line 10, between "44" and "and", kindly insert a space.

Column 8, line 15, kindly delete "is" and insert ---- in ----.

Signed and Sealed this

Twenty-third Day of February, 1999

*Attest:*

Q. TODD DICKINSON

*Attesting Officer*  *Acting Commissioner of Patents and Trademarks*